United States Patent [19]

Mersman et al.

[11] Patent Number: 4,989,910
[45] Date of Patent: Feb. 5, 1991

[54] PIVOTED SLIDE-OUT VISOR PANEL

[75] Inventors: Wesley D. Mersman, Holland; Russell L. Clark, Zeeland, both of Mich.

[73] Assignee: Prince Corporation, Holland, Mich.

[21] Appl. No.: 472,712

[22] Filed: Jan. 31, 1990

[51] Int. Cl.⁵ .............................................. B60J 3/02
[52] U.S. Cl. ................................... 296/97.4; 296/97.8; 296/97.12
[58] Field of Search ................... 296/97.1, 97.4, 97.5, 296/97.6, 97.8, 97.11, 97.12

[56] References Cited

U.S. PATENT DOCUMENTS

| D. 281,413 | 11/1985 | Prince Corp. et al. | 296/97 |
|---|---|---|---|
| 1,755,486 | 3/1927 | Clements . | |
| 1,898,276 | 9/1931 | Van Dresser . | |
| 2,107,247 | 6/1935 | Johnson | 296/97 |
| 2,252,716 | 8/1941 | Levy | 296/97.5 |
| 2,498,966 | 2/1950 | Sauer | 296/97.4 X |
| 2,596,873 | 5/1952 | Solmes | 296/97.8 |
| 2,685,336 | 6/1952 | Menighan | 160/33 |
| 2,755,126 | 6/1953 | Ludlow | 296/97 |
| 2,894,576 | 6/1957 | Williams | 160/220 |
| 3,085,827 | 4/1963 | Cederberg et al. | 296/97.6 |
| 3,158,396 | 7/1963 | Berger | 296/97 |
| 3,336,073 | 8/1965 | Berger | 296/97 |
| 3,343,868 | 9/1967 | Manookian | 296/97.4 |
| 3,499,679 | 3/1970 | Olander | 296/97.6 |
| 3,877,745 | 4/1975 | Girard | 296/97 |
| 4,003,597 | 1/1977 | Acuff | 296/97 |
| 4,149,749 | 4/1979 | Canal | 296/97.1 |
| 4,323,275 | 4/1982 | Lutz | 296/97.8 |
| 4,486,819 | 12/1984 | Marcus et al. | 362/142 |
| 4,491,360 | 1/1985 | Fleming | 296/97 |
| 4,492,404 | 1/1985 | Marcus et al. | 296/97 |
| 4,624,499 | 11/1986 | Flowerday | 296/97 |
| 4,734,831 | 3/1988 | Keyser et al. | 362/74 |
| 4,929,014 | 5/1990 | Clark et al. | 296/97.8 |

FOREIGN PATENT DOCUMENTS

| 876647 | 5/1953 | Fed. Rep. of Germany | 296/97.8 |
|---|---|---|---|
| 904743 | 2/1954 | Fed. Rep. of Germany | 296/97.11 |

Primary Examiner—Dennis H. Pedder
Assistant Examiner—Gary C. Hoge
Attorney, Agent, or Firm—Price Heneveld Cooper DeWitt & Litton

[57] ABSTRACT

A visor system includes a visor panel which is concealed in a vehicle headliner and can be extended from the headliner and pivoted downwardly to an adjusted use position. The visor includes an auxiliary pivoted panel which as the visor is extended from its stored position, pivots outwardly to provide additional visor coverage to one side of the main visor panel.

17 Claims, 2 Drawing Sheets

PIVOTED SLIDE-OUT VISOR PANEL

BACKGROUND OF THE INVENTION

The present invention pertains to automotive visors and particularly to a slide-out visor panel with an auxiliary panel pivotally mounted thereto.

There exists a variety of visors having auxiliary panels incorporated therein. U.S. Pat. No. D281,413, for example, discloses a conventionally mounted decorative visor which includes a slide-out panel which can be extended from one end thereof. Similarly, U.S. Pat. Nos. 4,486,819; 4,624,499; and 4,736,831 all disclose visors having illuminated vanity mirror packages which either slide or pivot from the main body of the visor. Each of these visors are conventionally mounted to the vehicle roof by a pivot mounting bracket for movement between a raised stored position or a lowered use position either at the windshield or side window positions.

Other visors have been proposed which slide from the vehicle roof itself and pivot downwardly. Such construction is represented by U.S. Pat. No. 4,491,360 and 4,492,404. Although these visor's construction address and solve their individual needs, the visors do not integrally include supplemental corner window protection, nor do they provide a concealed visor which extends from a vehicle headliner and at the same time expands in width.

SUMMARY OF THE PRESENT INVENTION

The visor system of the present invention provides a visor panel which is concealed in a vehicle headliner, and can be extended from the headliner and pivoted downwardly to an adjusted use position. The visor includes an auxiliary pivoted panel which as the visor is extended from its stored position, pivots outwardly to provide additional visor coverage to one side of the primary visor panel. Such compact construction thereby provides for concealed storage of the visor within the vehicle headliner and yet when extended, provides a substantially increased visor width which provides full window coverage including the corner area of the vehicle windshield. In the preferred embodiment of the invention, the auxiliary panel is pivotally mounted to an upper corner of the main visor panel and is biased to automatically extend outwardly from the main panel as it is extended from the vehicle roof.

Apparatus embodying the present invention includes a visor support adapted to be mounted to the roof of a vehicle behind the headliner thereof for concealed mounting of a primary visor panel which is moveably mounted to the support for extension and retraction from a slot in the vehicle roof adjacent the junction of the roof and vehicle window. Movably mounted to the primary visor panel is an auxiliary visor panel which is extended to one side of the primary panel as the primary panel is extended from the housing for use. In a preferred embodiment of the invention, bias means are provided for urging the auxiliary panel in an extended position. As the primary visor panel is retracted, the support and auxiliary panel include means for automatically urging the panel into a compact storage position overlying the primary panel as it retracts into the support behind the vehicle headliner.

Thus the visor system of the present invention provides a relatively compact concealed visor which provides full windshield coverage by the utilization of a pivoted auxiliary visor panel which automatically extends in a preferred embodiment from the primary panel as it is extended for use. These and other features, objects and advantages of the present invention, will become apparent to those skilled in the art upon reading the following description thereof together with reference to the accompanying drawings in which:

DETAILED DESCRIPTION OF THE PREFERRED EMBODIMENT

Figure 1:
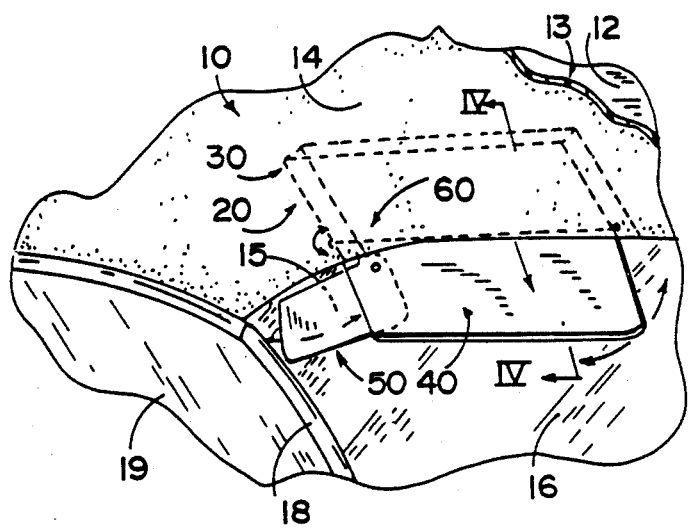
FIG. 1 is a fragmentary perspective view of a vehicle incorporating a visor system embodying the present invention.

Referring initially to FIG. 1 there is shown a vehicle 10 such as an automobile having a sheet metal roof 12 to which a headliner panel 14 is mounted in overlying spaced relationship. Panel 14 can be a preformed molded panel of current commercial construction. The headliner extends to the upper forward edge of the windshield 16 of the vehicle which joins at its side to the A-pillar 18 of the vehicle extending between the windshield 16 and a side window 19. Mounted to the roof 12 and in the space 13 between roof 12 and headliner 14 is the visor assembly 20 of the present invention.

Figure 2:
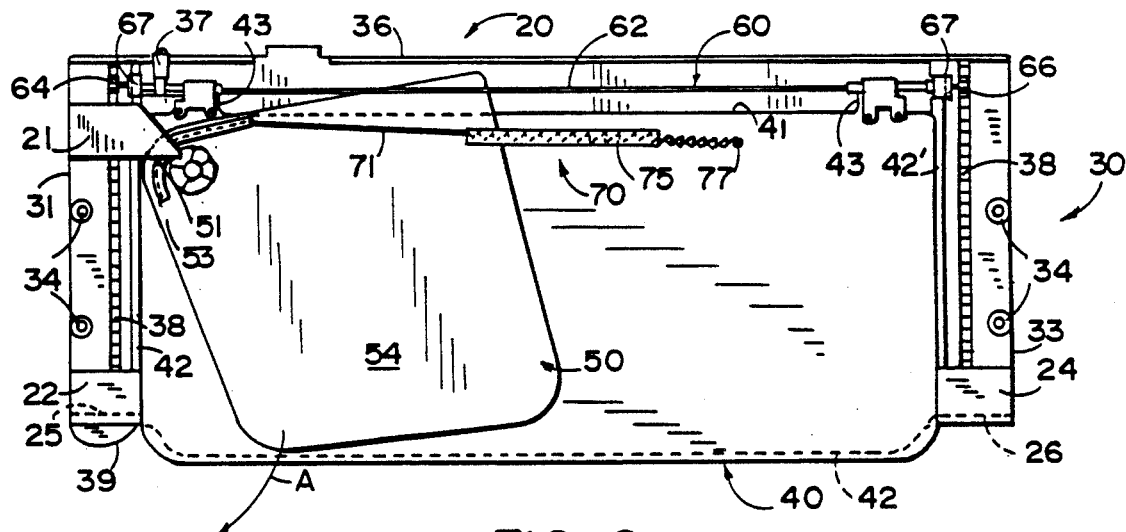
FIG. 2 is a front elevational view of a visor system embodying the present invention shown in a first position.
Figure 3:
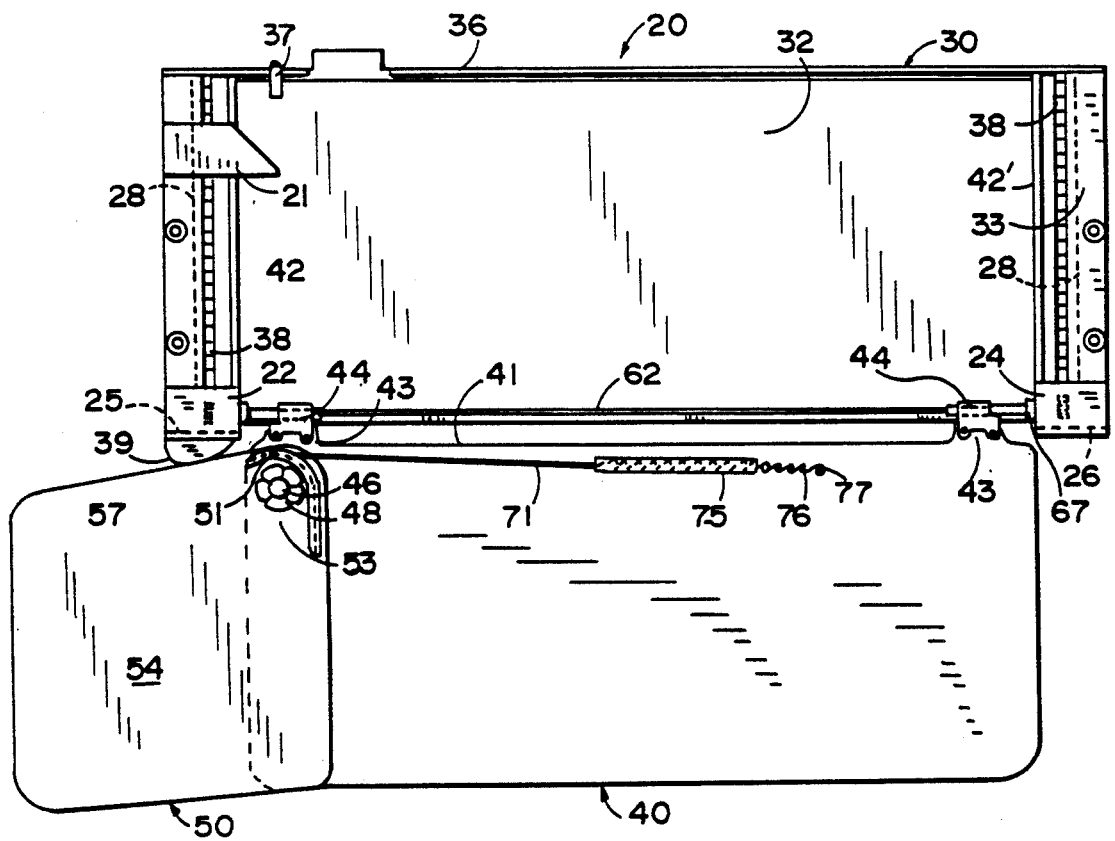
FIG. 3 is a front elevational view of the structure shown in FIG. 2 with the visor shown in an extended use position.

Visor assembly 20 includes three major components as best seen in FIGS. 2 and 3 comprising a housing or visor support 30, a primary visor panel 40, a pivoted auxiliary visor panel 50, and means 60 (shown schematically in FIG. 1) for pivotally and slidably mounting the primary panel 40 within housing 30 for movement between a retracted position shown in phantom form in FIG. 1 to an extended use position as shown in solid lines in FIG. 1. Also means are provided as described below for pivotally mounting the auxiliary panel 50 to the primary visor 40 and for biasing the auxiliary panel 50 to an extended use position filling the corner area 15 of windshield 16 adjacent the A-pillar 18 for providing supplemental full windshield sunblocking protection. The sun visor assembly 20 as best seen in FIGS. 2 and 3 can be constructed as a sub unit for installation to the vehicle 10 during manufacture of the vehicle. The headliner 14 includes a slot 17 (FIG. 4) at its forward edge to allow the extension and retraction of the visor panels 40 and 50 therefrom.

Figure 4:
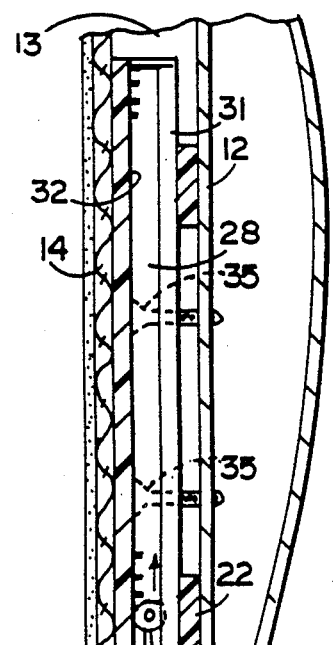
FIG. 4 is an enlarged fragmentary cross-sectional view of the visor shown in FIG. 1 and taken along section IV—IV of FIG. 1.
Figure 6:
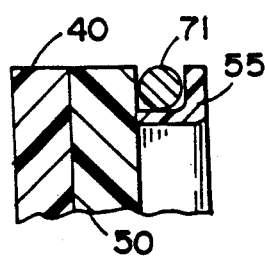
FIG. 6 is an enlarged cross-sectional view of a portion of the structure shown in FIG. 5 taken along section lines VI—VI of FIG. 5.

Turning now to FIGS. 2 and 3, the visor assembly 20 is shown in detail. The housing or support 30 comprises a generally rectangular panel 32 made of a polymeric material such as polycarbonate or other suitable material and includes a pair of sidewalls 31 and 33 having apertures 34 formed therethrough for securing the housing 30 to the roof 12 of the vehicle through suitable fastening means such as screws 35 shown in FIG. 4. Sidewalls 31 and 33 extend upwardly and outwardly as best seen in FIGS. 2 and 4 to substantially fill the space between roof 12 and headliner 14 and allow clearance for the panels 40 and 50 therebetween. The upper edge of housing 30 includes an integral wall 36 extending across and joining end walls 31 and 33 providing additional support for the housing and serving as a mounting member for a spring-loaded metallic locking clip 37 which engages a pivot axle 60 of mounting means 60 for releasably holding the visor in a raised stored position as illustrated in FIG. 2.

Mounted adjacent sidewalls 31 and 33, and inboard thereof and facing forwardly from the surface of panel 32 are a pair of parallel gear racks 38 which extend from the top to the bottom of panel 32 for interengaging with the mounting means 60 as described below. Coupled to sidewall 31 is a pair of spaced camming members including a first member 39 having a rounded lower edge for engaging and camming pivoted panel 50 toward a stored position as illustrated in FIG. 3 as it is moved upwardly. The second camming member 21 engages a camming surface 51 on panel member 55 to insure panel 50 is in a fully stored position when retracted as shown in FIG. 2. Housing 30 also includes a pair of flat rectangular spacer blocks 22 and 24 and lower end walls 25 and 26 limiting the downward motion of the visor panels 40 and 50.

The primary visor panel 40 comprises a flat generally rectangular panel made of a polymeric material such as polycarbonate which is integrally molded and may include a reinforcing rib 42 extending around the outer lower periphery thereof as best seen in FIGS. 2 and 4 for added strength and stability. Along the upper edge 41 of the panel there is provided a pair of spaced mounting tangs 43 located near opposite ends thereof and extending upwardly for rotatably securing an axle 62 to and in spaced parallel relationship with upper edge 41 of the panel. Axle 62 is held to tangs 43 by means of mounting bushings 44 which allow the rotation of axle 62 in supported spaced relationship to tangs 43 on the upper edge of panel 40. The mounting of the primary visor 40 panel, to the pivot axle 62, allows the visor to be pivoted in a fore and aft position as illustrated by arrow B in FIG. 4 for adjustment as desired.

Fixedly coupled to the ends of pivot rod 62 forming a part of mounting means 60 are a pair of gears 64 and 66 which interengage and rotate over racks 38 for controlling the motion of the visor panel 40 as it is raised and lowered to provide smooth guided support for the movement of the visor panel from its retracted position within the headliner to an extended position for use. The ends of pivot axle 62 extends slightly beyond the gears 64 and 66 and within a slot 28 FIGS. 3 and 4 formed in each of the sidewalls 31 and 33 for captively holding the mounting means 60 to the housing. Thus slots 28 are formed in alignment with the axle 62 and have a depth and width sufficient to allow the rotatable pivot axle 62 to move freely therein while maintaining the gears 64 and 66 in engagement with the respective racks 38. For such purpose, the sidewalls 31 and 33 can be generally L-shaped and secured to panel 32 during assembly of the visor such that slots 28 are defined by the outer edges of panel 32 and the facing surfaces of end walls 31 and 33.

Panel 32 may also include a pair of guide tracks 42' extending in spaced inward parallel relationship to racks 38 and which are engaged by sliding guide blocks 67 mounted to pivot rod 62 as best seen in FIG. 2 to provide supplemental guide and support for the smooth motion of the panel 40 with respect to housing 30.

Panel 40 includes in its upper left corner, as viewed in FIGS. 2 and 3, an aperture for receiving a pivot pin 46 which pivotally couples the generally square but slightly trapezoidal shaped auxiliary panel 50 to panel 40. Pivot pin 46 is a substantially short member as best seen in FIG. 4 to allow clearance of the panels within the space 13 between the headliner and roof of the vehicle. Pivot member 46 can be a steel stub axle held in place between panels 40 and 50 by a pair of Tennerman nuts 48 on opposite ends thereof if desired, or by other suitable fastening means. Pivot axle 46 extends through one corner 53 of panel 50 to allow the panel to pivot into a stored position as shown in FIG. 2 overlying panel 40 or in an extended use position as shown in FIGS. 1, 3 and 4 in which it is substantially extended from the stored position and toward the A-pillar 18 during use. To automatically move panel 50 from the retracted stored position to the extended use position, spring bias means 70 as best seen in FIGS. 2-6 is employed.

Figure 5:
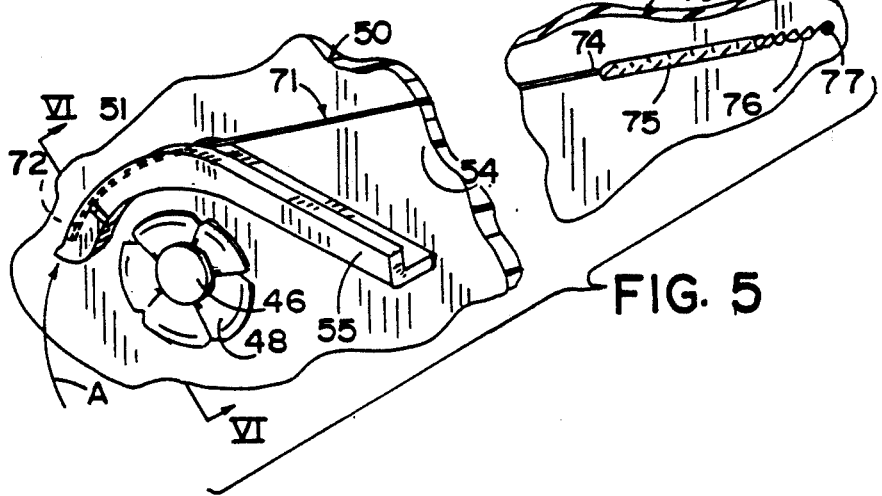
FIG. 5 is an enlarged fragmentary perspective view of a portion of the structure shown in FIGS. 2 and 3.

Panel 50 like panel 40 is a relatively thin panel made of a suitable polymeric material such as polycarbonate and like panel 40 has rounded corners for safety and esthetic purposes. Mounted to the forward facing surface 54 of panel 50 as best seen in FIG. 5 is a generally L-shaped curved guide channel 55 into which one end 72 of a cable 71 is anchored. The opposite end 74 of cable 71 is coupled to a tension spring 75 having its end 76 remote from cable 71 anchored to panel 40 by means of a mounting pin 77 as best seen in FIGS. 2 and 3. Cable 71 and spring 75 are conveniently positioned near the top edge of the visor panel 40 so that they remain substantially concealed as the visor is withdrawn to a position shown in FIGS. 1 and 4. The spring provides a pivoting torque due to the spaced mounting of the curved L-shaped member 55 from the pivot pin 46 a distance sufficient to provide a rotating force urging panel 50 outwardly in a direction indicated by arrow A in FIGS. 2 and 5 as panel 40 is withdrawn from housing 30. Thus as the visor is extended for use, panel 50 conveniently and automatically extends to widen the visor to fill in the side pillar area.

As the visor is retracted, the upper edge 57 of panel 50 engages curved camming surface 39 as best seen in FIG. 3 and is forced to pivot in a counterclockwise direction as seen in FIGS. 2 and 3 opposite the direction of arrow A, toward the stored position. The L-shaped channel member 55 includes a raised ledge defining a second camming surface 51 which is engaged by the lower edge of cam member 21 for assuring that the auxiliary panel 50 remains in a fully retracted position as shown in FIG. 2 when the visor is stored.

Thus the visor system of the present invention provides a concealed slide-out visor with controlled motion to allow its extension and retraction from a stored position behind the vehicle headliner. The auxiliary visor panel 50 is extended from the primary visor panel 40 as it is withdrawn to provide supplemental full windshield coverage. In the preferred embodiment, the auxiliary visor panel is automatically extended by biasing means coupled between the auxiliary panel and the primary panel. Thus, the system of the present invention provides a compact attractive and functional full windshield coverage visor system for concealed installation in a vehicle utilizing a minimum of space. It will become apparent to those skilled in the art that various modifications to the preferred embodiment of the invention can be made without departing from the spirit or scope thereof as defined by the appended claims.

What is claimed is:

1. A visor system comprising:
a visor support adapted to be mounted to a vehicle roof;
a first visor panel movably mounted to said support for extension and retraction from a stored position to a use position extended from said support;
a second visor panel movably mounted to said first panel for movement from a stored position substantially overlying said first panel when said first panel is in a stored position and a second position extended laterally from said first position to extend said second panel away from said first panel for enlarging the coverage of said first panel when in a use position; and
bias means coupling said first and second panels such that said second panel is moved to an extended position by the force of said bias means as said first panel is extended to a use position.

2. A visor system comprising:
a support adapted to be mounted in a space between a vehicle headliner and a vehicle roof and attached to the vehicle roof;
a first visor panel movably mounted to said support for extension and retraction from a stored position to a use position extended from said support;
a second visor panel pivotally mounted to said first panel for movement from a stored position substantially overlying said first panel when said first panel is in a stored position and a second position extended from said first position to extend said second panel away from said first panel for enlarging the coverage of said first panel when in a use position; and bias means coupling said first and second panels such that said second panel is pivoted outwardly to an extended position by the force of said bias means as said first panel is extended to a use position.

3. The visor system as defined in claim 2 wherein said support includes cam means cooperatively engaging said second visor panel for urging said second visor panel toward said stored position as said first panel is also moved to a stored position.

4. The visor system as defined in claim 3 and further including means for pivoting said first panel with respect to said support.

5. The visor system as defined in claim 4 wherein said means for pivoting said first panel with respect to said support includes a pivot axle and gear means at opposite ends thereof for guidably supporting said pivot axle in rotatable engagement with respect to said support and said first visor panel.

6. A vehicle visor comprising:
a visor support member including a pair of parallel extending guide means and means for attaching said support member to a vehicle roof;
a first visor panel movably mounted to said support member and coupled to said guide means for extension and retraction between use and stored positions;
an auxiliary visor panel smaller than said first panel and pivotally mounted to said first panel for movement from a stored position substantially overlying said first panel when said first panel is in a stored position and a second position pivoted from said first position to extend said second panel away from said first panel for enlarging the coverage of said first panel when in a use position; and
means coupled between said first and auxiliary panels for urging said auxiliary panel between said stored and second positions as said first visor panel is moved between said stored and use positions respectively.

7. A vehicle visor comprising:
a visor support member including a pair of parallel extending guide means and means for attaching said support member to a vehicle roof;
a first visor panel movably mounted to said support member and coupled to said guide means for extension and retraction between use and stored positions;
an auxiliary visor panel smaller than said first panel and pivotally mounted to said first panel for movement from a stored position substantially overlying said first panel when said first panel is in a stored position and a second position pivoted from said first position to extend said second panel away from said first panel for enlarging the coverage of said first panel when in a use position; and
bias means coupling said first and auxiliary panels such that said auxiliary panel is pivoted outwardly to an extended position by the force of said bias means as said first panel is extended to a use position.

8. The visor system as defined in claim 7 wherein said support member includes cam means cooperatively engaging said auxiliary visor panel for urging said auxiliary visor panel toward said stored position as said first panel is also moved to a stored position.

9. The visor system as defined in claim 8 and further including means for releasably holding said first visor in a stored position.

10. The visor system as defined in claim 9 wherein said guide means for mounting said first panel to said support member includes a pivot axle and gear means at opposite ends thereof for guidably supporting said pivot axle in rotatable engagement with respect to said support member and said first visor panel.

11. A visor system comprising:
a vehicle headliner having a slot formed therein adjacent a vehicle window, said headliner mounted to a vehicle roof in spaced relationship thereto;
a support adapted to be mounted in the space between said headliner and a vehicle roof and attached to the vehicle roof;
a first visor panel movably mounted to said support for extension and retraction from a concealed stored position behind said headliner to a use position extended from said slot to cover an upper portion of the window;
an auxiliary panel pivotally mounted to said first panel for movement from a stored position substantially overlying said first panel when said first panel is in a stored position and a second position extended from said first position to extend said auxiliary panel away from said first panel for enlarging the coverage of said first panel when in a use position; and
bias means coupling said first and auxiliary panels such that said auxiliary panel is pivoted laterally outwardly to an extended position by the force of said bias means as said first panel is extended to a use position for widening the coverage provided by said first panel.

12. The visor system as defined in claim 11 wherein said support includes cam means cooperatively engaging said second visor panel for urging said second visor panel toward said stored position as said first panel is also moved to a stored position.

13. A concealed visor mounted behind a vehicle headliner and movable between a concealed stored position and an extended use position, said visor comprising:

a first panel; a second panel which moves in relationship to said first panel as said visor is extended outwardly from said headliner to increase the effective width of said visor when extended, said visor including bias means between said first panel and said second panel to urge said second panel away from said first panel as said visor is extended.

14. The visor as defined in claim 13 wherein said second panel is movably mounted to said first panel for movement from a first stored position substantially overlying said first panel when said first panel is in a stored position to a second position extended from said first stored position to extend said second panel away from said first panel for enlarging the coverage of said first panel when in a use position.

15. The visor system as defined in claim 14 wherein said second panel is pivotally mounted to said first panel.

16. A concealed visor mounted behind a vehicle headliner and movable between a concealed stored position and an extended use position in which the effective width of the visor increases, said visor comprising:

a first visor panel and a second visor panel pivotally mounted to said first panel for movement from a stored position substantially overlying said first panel when said first panel is in a stored position and a second position extended from said first position to extend said second panel away from said first panel for enlarging the coverage of said first panel when in a use position; and bias means coupling said first and second panels such that said second panel is pivoted outwardly to an extended position by the force of said bias means as said first panel is extended to a use position.

17. The visor system as defined in claim 16 wherein said support includes cam means cooperatively engaging said second visor panel for urging said second visor panel toward said stored position as said first panel is also moved to a stored position.

* * * * *